United States Patent Office 3,284,429
Patented Nov. 8, 1966

3,284,429
PURIFICATION OF POLYOLEFINS
Otto Fuchs, Hofheim, Taunus, and Anton Staller, Dieter Ulmschneider, and Josef Walter, Frankfurt am Main, Germany, assignors to Hercules Incorporated
No Drawing. Filed Sept. 14, 1964, Ser. No. 396,400
Claims priority, application Germany, Sept. 25, 1963, F 40,827
9 Claims. (Cl. 260—93.7)

The present invention relates to a process for the purification of polyolefins. In the aqueous purification of a polyolefin prepared in an inert organic diluent by use of a transition metal catalyst, e.g., in steam distillation of the reaction medium or during washing of the reaction mixture or of the mechanically separated raw polymer with an aqueous medium it is helpful for the removal of the water-soluble catalyst residue to add to the suspension a water-soluble emulsifier which wets the polyolefin. The emulsifier should meet the following requirements: (1) besides a good water solubility it should also have a good wetting power for the polyolefin. The minimum amount of emulsifier required for wetting 100 g. of powdery polyolefin in 100 g. of water is conveniently used as a relative measure of the wetting power; (2) the emulsifier should resist hydrolytic decomposition at elevated temperatures, e.g., at 100–120°, in order not to lose its emulsifying properties during the processing; (3) since a part of the emulsifier remains adhered to the polyolefin, it should be colorless and should not discolor under the polyolefin processing conditions (250–300° C.); (4) if a polyolefin, which has been processed in the presence of an emulsifier, is used for articles which come in contact with food (e.g. bottles, pots, pans, packaging material), the emulsifier should be odorless, tasteless, and nontoxic; (5) for the preparation of objects for the electric industry the residual emulsifier should not noticeably influence the electrical properties; (6) the sensitivity of the polyolefins to oxidation when exposed to the action of heat or light should not be increased by emulsifier residues and; (7) finally, the emulsifier should not be volatile with steam, since if it were volatile, it would be necessary to replenish the emulsifier in the mixture continuously during the steam distillation of the reaction medium.

Numerous compounds have been proposed as emulsifiers for the above-mentioned purpose. However, most known emulsifiers fail to meet at least one of the criteria mentioned. Thus, ionic emulsifiers deteriorate the electrical properties of the polyolefins too greatly. Polyvinyl alcohol, which also has been proposed, causes a distinct discoloration of the polymer during injection molding, the degree of which is independent of the content of residual acetyl groups in the polyvinyl alcohol. Emulsifiers based on ethylene oxide, e.g. polyethylene oxide itself or ethoxylated alcohols or acids, have the disadvantage that even in amount less than 0.1%, based on the polyolefin, they cause deterioration of the heat stability of the latter. Emulsifiers which form free acids by hydrolysis, are harmful since they attack the metal containers thus causing a discoloration and catalytic oxidation-acceleration of the polyolefins. Emulsifiers consisting of the copolymers of ethylene and sodium maleate are disadvantageous in that prohibitive quantities thereof are required in order to wet the polyolefin with water.

A method has now been found for purifying such polyolefins by aqueous methods, which is characterized by the employment of an emulsifier selected from the class consisting of (a) homopolymers of an N-vinyl amide having the formula

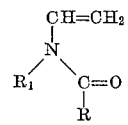

where R may be hydrogen, an alkyl, oxalkyl, alkylaryl, or aryl radical and $R_1$ may be the same as R or an acyl radical; (b) copolymers of such N-vinyl amides with ethylenically unsaturated comonomers which are not easily hydrolyzed; (c) water soluble polymers of N-vinyl lactams and, (d) water soluble copolymers of such N-vinyl lactams with other ethylenically unsaturated comonomers.

The process of the invention may be applied to the polymer produced in the polymerization of any 1-olefin, e.g., ethylene, propylene, butene-1, 3-methylpentene-1, etc., or copolymers of such olefins, using the aforesaid catalyst system. In accordance with this known polymerization method, the olefin is contacted at relatively low pressure and temperature with a catalyst prepared by mixing a compound of a transition metal of Groups IV–B or V–B of the Periodic Table with an organometallic compound of a metal of Group III–A of the Periodic Table. The so-called transition metal compound may be an inorganic salt such as a halide, oxyhalide, etc., or an organic salt or complex such as an acetylacetone, etc. Exemplary of the transition metal compounds that may be used are titanium and zirconium tetrachlorides, titanium di- and trichloride, tetrabutyl titanate, zirconium acetylacetonate, vanadium oxyacetylacetonate, etc. The organometallic compound that is reacted with one of the transition metal compounds or mixtures thereof may be, for example, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes, as for example, sodium aluminum tetraethyl, lithium aluminum tetraoctyl, etc.

Another method of carrying out the polymerization process is to use a two-component catalyst system. In one such system the insoluble precipitate which is formed by mixing the transition metal compound and the organometallic compound as described above is separated and then used in combination with an additional organometallic compound. The insoluble reaction product will be readily separated, if the reaction took place in an inert diluent, from the diluent and soluble reaction by-products by centrifuging, filtering, or any other desired means. In some cases it may be desirable to wash the insoluble reaction product with additional amounts of hydrocarbon diluent in order to completely remove all of the soluble by-products. This hydrocarbon-insoluble reaction product is then used in combination with an organometallic compound as exemplified above. This second catalyst component may be the same organometallic compound that was used in preparing the insoluble reaction product catalyst component or it may be a different organometallic compound. Of particular importance is the use of such a hydrocarbon-insoluble reaction product in combination with an aluminum trialkyl such as triethylaluminum, triisobutylaluminum trioctylaluminum, etc.

In another two-component catalyst system, the whole reaction mixture formed on mixing a transition metal compound and an organometallic compound may be used in combination with an additional organometallic compound, if the latter is halogen-free. This two-component catalyst system is particularly useful for the polymerization of linear 1-olefins.

These polymerization processes are carried out in a wide variety of ways, as, for example, as batch or continuous operations and with or without the use of an inert organic diluent as the reaction medium. However, for the purpose of the present invention there must be used an inert, organic diluent that is liquid under the reaction conditions. Preferred diluents are saturated aliphatic hydrocarbons boiling in the range of 70–250° C.

As pointed out already, the transition metal compound and the organometallic compound may be reacted in situ, as, for example, in the particularly effective method of polymerizing diolefins wherein a trialkylaluminum is reacted in situ with a tetraalkyl titanate. They may also be reacted prior to the introduction of the olefin or they may be reacted and then used in combination with additional organometallic compound. They may also be added in increments during the polymerization and many other such variations may be utilized. Many other variations may be made in the polymerization system to which the process of this invention may be applied. For example, when lower molecular weight polymers are desired, a viscosity reducing agent such as a haloalkane, as, for instance, carbon tetrachloride, etc., or hydrogen, or other such agent may be added.

Wetting agents which can be used include homopolymers such as poly-(N-vinyl-N-methylacetamide), poly-(N-vinyl-N-methylpropionamide), poly-(N-vinyl-N-isobutylacetamide) and the like, as well as copolymers of such N-vinyl-N-alkyl acid amides with ethylenically unsaturated compounds such as vinylalkyl ethers, vinyl esters, acryl esters, hydrocarbons capable of copolymerization, such as styrene and acrylamide.

Equally suitable are homopolymers of substituted N-vinyl-amides, such as N-vinyl-N-methyl-β-hydroxy propionamide, N-vinyl-N-methyl-phenylacetamide, N-vinyl-N-methyl-benzamide, or N-vinyl-N-(β-hydroxyethyl)-acetamide, N - vinyl - N - benzyl-acetamide, N-vinyl-N-phenyl-acetamide, N-vinyl-acetic acid-imide, and also copolymers of such compounds with comonomers of the kind described above. In place of the polymers or copolymers of open-chain tertiary vinyl-amides characterized above, water-soluble polymers of N-vinyllactams, such as polyvinylpyrrolidone, and water-soluble copolymers of these lactams with other ethylenically unsaturated compounds capable of copolymerization, may be used.

However, of the great number of homo- and copolymers thus possible only those which are readily soluble in water are useful for the present purpose. The solubility in water depends upon the middle, relatively hydrophobic portion (hereafter for brevity referred to as rhP) of the emulsifier, expressed by the total number of C-atoms per 1 N-atom. Therefore, the rhP is in the case of the readily water-soluble poly-(N-vinyl-N-methylacetamide) is 5; and the lowest rhP value of any of the claimed substances is $rhP=4$, exhibited by poly-(N-vinylacetamide). The copolymer of 20 mole percent N-vinyl-N-methylacetamide and 1 mole percent of 2-ethylhexyl acrylate with a rhP of about 5.6 is still readily water-soluble. However, upon further reduction of the nitrogen content and simultaneous increase of the carbon content per molecular unit water solubility decreases until finally insolubility occurs. An exact limit for the beginning of the insolubility in water cannot be given, since, in the case of copolymers, water solubility also depends upon the nature of the several comonomers used. For example, a copolymer of N-vinyl-N-methylacetamide and styrene becomes insoluble at a smaller rhP than a copolymer of N-vinyl-N-methylacetamide and, e.g., vinylethyl ether, since in the latter case the O-atom also possesses hydrophilic properties.

In general it can only be said that the rhP of the homopolymers should lie between about 4 and about 12. The wetting power increases with increasing rhP. For example, the wetting of 100 g. of powdery polyolefin with water requires the following amounts of emulsifier:

1.00 g. of poly-N-vinyl-N-methylacetamide ($rhP=5.0$), 0.15 g. of copolymer of 20 moles of N-vinyl-N-methylacetamide and 1 mole of 2-ethylhexyl acrylate ($rhP=5.55$), and 0.06 g. of poly-N-vinyl-N-methylpropionamide ($rhP=6.0$).

By comparison, the emulsification of the same amount of polyolefin requires 0.13 g. of the conventional emulsifier, polyglycol stearate with a content of about 25 mole percent of ethylene oxide.

The wetting power of the emulsifiers is determined as follows:

Fifteen ml. of distilled water is added to 3 g. of powdery polyolefin (e.g., polyethylene or polypropylene) free of emulsifier. A 0.1% aqueous solution of the emulsifier being investigated is added from a buret at 20° C. with shaking until the polyolefin, which in the absence of the emulsifier is not wetted and floats on top, is completely suspended in the aqueous phase. The amount of emulsifier necessary for complete wetting of 100 g. polyolefin is calculated from the amount of emulsifier solution required for complete suspension.

The molecular weight of the above-mentioned emulsifiers has little or no influence on their effectiveness. For example, poly-N-ethyl-acetamide and poly-N-vinyl-N-methyl-propionamide with molecular weights of about 10,000 and about 50,000, respectively, behave very similarly.

To demonstrate the superiority of the emulsifiers of this invention compared with those of the prior art, as regards the *heat stability* of the polyolefin treated with them, 0.1% of the emulsifiers to be compared was homogeneously added to powdery polypropylene free of other emulsifiers. In addition, 0.2% of dilaurylthiodipropionate was added for general technical stabilization. Plates 1 mm. thick were molded from the mixtures at 200° C. These molded plates were heated in an oven at 140° C. until the beginning of destruction by oxidation was recognizable by embrittlement. The time required for the currence of embrittlement, expressed in days, gives a measure of the thermostability ("Brittle Time") of the polypropylene plates containing the same small amounts of the different emulsifiers.

In Table 1 some examples of emulsifiers according to this invention are compared with a conventional emulsifier which behaves most favorably of all the products known heretofore. A polypropylene plate molded in the same manner, but containing no emulsifier, was also tested as a control.

Table 1

| Specimen No. | Emulsifier (always 0.1%) | Brittle Time in Days at 140° C. |
|---|---|---|
| 1 | Without emulsifier (comparison) | 12 |
| 2 | Ethoxylated stearic acid with about 25 moles of ethylene oxide (comparison). | 1–3 |
| 3 | Poly-N-vinyl-N-methlacetamide | 5–7 |
| 4 | Poly-N-vinyl-N-ethylacetamide | 11–15 |
| 5 | Poly-N-vinyl-N-methylpropionamide | 16–23 |
| 6 | Poly-N-vinyl-N-methylisobutyramide | 15–17 |
| 7 | Copolymer of 20 moles N-vinyl-N-methylacetamide and 1 mole 2-ethylhexyl acrylate. | 13–14 |
| 8 | Copolymer of N-vinyl-N-methylacetamide and acrylamide, 1:1 molar. | 12–23 |
| 9 | Copolymer of 2 moles of N-vinyl-N-methylacetamide, 2 moles of acrylamide and 1 mole of ethyl acrylate. | 12–18 |

The brittle times given are the extreme values obtained in each test series. The examples show that poly-N-vinyl-N-alkyl-acid amides of the kind described above (specimens Nos. 3 to 6), as well as copolymers of N-vinyl-N-alkyl-acid amides with other compounds capable of copolymerization (specimens 7 to 9) are considerably superior regarding the stability of the polyolefin treated therewith, to the conventional emulsifier (specimen 2). Furthermore, the comparison of specimens Nos. 4 to 9 with specimen No. 1, having no emulsifier, shows clearly that the emulsifiers of this invention have a degree of stabilizing action.

The same differences in the stability occur when a synergistic mixture of a phenolic antioxidant with a sulfur-containing stabilizer is used. For example, the following relative values for the brittle times (in days, test temperature 140° C.) were obtained under otherwise the same conditions:

43–45 without emulsifier addition and
48–51 after addition of 0.1% of emulsifier No. 7 of Table 1, but only
25–30 upon addition of polyglycol stearate.

Another advantage of the new emulsifiers is the fact that upon injection molding of polyolefins treated with them there is little or none of the discoloration of the polymer which is observed when conventional emulsifiers, even in the presence of conventional stabilizers, are employed. The data in Table 2 show this advantage very clearly. The investigations reported in Table 2 were carried out on molded polypropylene plates containing 0.1% of the emulsifier to be tested +0.1% of a condensation product of nonylphenol and acetone as stabilizer and 0.4% of calcium stearate as processing agent. The procedure in detail was as follows: one hundred parts of the powdery polypropylene was mixed with 5% solutions of the emulsifier, stabilizer and Ca-stearate in such a quantitative ratio that the concentrations of the emulsifier and stabilizer calculated on polypropylene amounted to about 0.5% and the concentration of Ca-stearate was about 2%. After drying under vacuum at 80° C., 400 parts of powdery polypropylene not pretreated was admixed thoroughly with the pretreated material and the mixture was granulated at 200° C. in a laboratory extruder, after which the granulate was molded in a conventional injection-molding apparatus at 275° C. into plates 2.5 mm. thick. In Table 2 the degree of yellowing of the individual sample plates is compared numerically as "yellowness." The yellowness represents a relative measure of the degree of yellowing and is determined by the Tri-stimulus process with the help of a color-filter device.

2 and 4 on the one hand with a polyolefin molded without emulsifier (specimen No. 1), and on the other hand, with one molded with a greatly reduced emulsifier content (specimen No. 3) shows further the additional stabilizer action of the poly-N-vinyl-N-alkyl acid amides or of the copolymers of N-vinyl-N-alkyl acid amide with other compounds capable of copolymerization.

Another advantage of the claimed products compared with many known emulsifiers is the fact that, physiologically, they are completely harmless in the amounts in which they are used.

What we claim and desire to protect by Letters Patent is:

1. In the purification of a polyolefin which has been prepared in an inert organic diluent in the presence of a catalyst comprising a compound of a metal selected from the group consisting of the metals of Group IV–B and V–B of the Periodic Table in combination with an organometallic compound of a metal of Group III–A of the Periodic Table wherein the polymer is contacted with water, the improvement which comprises effecting said contact in the presence of a wetting agent selected from the class consisting of (a) homopolymers of an N-vinyl amide having the formula

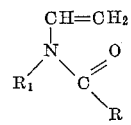

where R is selected from the class consisting of hydrogen, alkyl, oxalkyl, alkylaryl and aryl radicals and $R_1$ is selected from the class consisting of R and acyl radicals, (b) copolymers of such N-vinyl amides with ethylenically unsaturated comonomers, (c) water soluble polymers of N-vinyl lactams, and (d) water soluble copolymers of such n-vinyl lactams with ethylenically unsaturated comonomers.

2. The process of claim 1 where the wetting agent is a copolymer of an N-vinyl amide and an ethylenically unsaturated compound selected from the class consisting of acrylic acid esters, acrylamide, vinyl esters, vinyl ethers, and styrene.

3. The process of claim 1 where the contacting of the polymer with water is a steam distillation to remove the inert diluent.

4. The process of claim 1 where the contacting of the polymer with water is an aqueous wash.

5. The process of claim 1 where the wetting agent is a water soluble polymer of an N-vinyl amide.

Table 2

| Specimen No. | Emulsifier | Concentration (percent by wt.) | Yellow Value | |
|---|---|---|---|---|
| | | | Instrument | Subjective |
| 1 | None (control) | | 16.1 | (Noticeably yellow.) |
| 2 | Poly-N-vinyl-N-methyl-propionamide | 0.1 | 14.3 | (Very weak yellow tinge.) |
| 3 | Poly-N-vinyl-N-methyl-propionamide | 0.05 | 18.5 | (Yellowish.) |
| 4 | Copolymer of 20 moles of N-vinyl-N-methylacetamide and 1 mole of ethylhexyl-acrylate | 0.1 | 13.3 | (Very weak yellowish.) |
| 5 | Ethoxylated stearic acid with about 25 moles of ethylene oxide | 0.1 | 20.8 | (Yellowish-brownish.) |

It can clearly be seen from the above yellowness ratings as well as from the subjective evaluation of color tone of the test plates that in the presence of the emulsifiers of this invention (specimens Nos. 2 and 4) less discoloration occurs than with the control (specimen 1) while with a conventional emulsifier (specimen 5) considerable yellowing is observed. A comparison of specimens Nos.

6. Process of claim 5 where the N-vinyl amide is selected from the class consisting of N-vinyl-N-methyl acetamide, N-vinyl-N-ethyl acetamide, N-vinyl-N-isopropyl acetamide, N-vinyl-N-n-butyl acetamide, N-vinyl-N-methyl propionamide and N-methyl-N-ethyl propionamide.

7. The process of claim 6 where the polyolefin is polypropylene.

8. The process of claim 6 where the polyolefin is polyethylene.

9. The process of claim 6 where the N-vinyl amide is present in the amount of .06–1.0% by weight based on the polyolefin.

References Cited by the Examiner
UNITED STATES PATENTS

| | | | |
|---|---|---|---|
| 2,967,857 | 1/1961 | Pfeifer | 260—94.9 |
| 3,070,588 | 12/1962 | Klink et al. | 260—94.9 |

JOSEPH L. SCHOFER, *Primary Examiner.*

L. EDELMAN, *Assistant Examiner.*